United States Patent
Wang et al.

(10) Patent No.: US 10,910,636 B2
(45) Date of Patent: Feb. 2, 2021

(54) METHOD FOR MAKING BATTERY ELECTRODES

(71) Applicants: Tsinghua University, Beijing (CN); HON HAI PRECISION INDUSTRY CO., LTD., New Taipei (TW)

(72) Inventors: Da-Tao Wang, Beijing (CN); Ke Wang, Beijing (CN); Jia-Ping Wang, Beijing (CN); Shou-Shan Fan, Beijing (CN)

(73) Assignees: Tsinghua University, Beijing (CN); HON HAI PRECISION INDUSTRY CO., LTD., New Taipei (TW)

( * ) Notice: Subject to any disclaimer, the term of this patent is extended or adjusted under 35 U.S.C. 154(b) by 180 days.

(21) Appl. No.: 16/229,649

(22) Filed: Dec. 21, 2018

(65) Prior Publication Data
US 2019/0229327 A1   Jul. 25, 2019

(30) Foreign Application Priority Data
Jan. 23, 2018 (CN) .......................... 2018 1 0064090

(51) Int. Cl.
*H01M 4/139* (2010.01)
*C01B 32/16* (2017.01)
(Continued)

(52) U.S. Cl.
CPC ............. *H01M 4/139* (2013.01); *C01B 32/16* (2017.08); *H01M 4/0471* (2013.01); *H01M 4/38* (2013.01);
(Continued)

(58) Field of Classification Search
CPC ..... H01M 10/052–0525; H01M 4/139; H01M 4/38; H01M 4/04–0471; C01B 32/16
See application file for complete search history.

(56) References Cited

U.S. PATENT DOCUMENTS

| 7,413,723 B2 * | 8/2008 | Niu ....................... D01F 11/123 |
| | | 423/447.3 |
| 9,236,607 B2 * | 1/2016 | Wang ...................... H01M 4/13 |

(Continued)

FOREIGN PATENT DOCUMENTS

| CN | 103094526 | 5/2013 |
| CN | 103930603 | 7/2014 |

(Continued)

OTHER PUBLICATIONS

Li Sun et al., Sulfur embedded in a Mesoporous Carbon Nanotube Network as a Binder-Free Electrode for High-Performance Lithium-Sulfur Batteries, ACS Nano 2016, Dec. 22, 2015, 1300-1308.

*Primary Examiner* — Karie O'Neill Apicella
(74) *Attorney, Agent, or Firm* — ScienBiziP, P.C.

(57) ABSTRACT

A method for making a battery electrode is provided. A carbon nanotube material is provided. The carbon nanotube material is placed into a furnace containing carbon dioxide. The furnace is heated to a temperature about 800° C. to about 950° C., and the carbon nanotube material is oxidized. The oxidized carbon nanotube material is dispersed in a first solution to form a carbon nanotube suspension. An active material is ultrasonically dispersed in a second organic solvent to form an active material dispersion. The carbon nanotube suspension is mixed with the active material dispersion to form a second solution. The second solution is stirred by ultrasonic means and dried after filtering.

14 Claims, 18 Drawing Sheets

(51) Int. Cl.
*H01M 4/38* (2006.01)
*H01M 4/04* (2006.01)
*H01M 10/052* (2010.01)

(52) U.S. Cl.
CPC ....... *H01M 10/052* (2013.01); *C01B 2202/06* (2013.01)

(56) References Cited

U.S. PATENT DOCUMENTS

| | | |
|---|---|---|
| 2005/0002850 A1 | 1/2005 | Niu et al. |
| 2005/0163697 A1 | 7/2005 | Beguin et al. |
| 2014/0302322 A1 | 10/2014 | Silvy et al. |

FOREIGN PATENT DOCUMENTS

| | | | |
|---|---|---|---|
| CN | 104201339 A | * 12/2014 | ............ H01M 4/139 |
| CN | 104201339 | 8/2016 | |
| JP | 2003-505332 | 2/2003 | |
| JP | 2005-535550 | 11/2005 | |
| JP | 2009-057246 | 3/2009 | |

* cited by examiner

```
┌─────────────────────────────────────────────────────────┐  ─ 101
│ A carbon nanotube material is provided, and the carbon  │
│ nanotube material comprises a plurality of carbon        │
│ nanotubes.                                               │
└─────────────────────────────────────────────────────────┘

┌─────────────────────────────────────────────────────────┐  ─ 102
│ The carbon nanotube material is placed into a heating    │
│ furnace, and the heating furnace comprises a carbon      │
│ dioxide gas.                                             │
└─────────────────────────────────────────────────────────┘

┌─────────────────────────────────────────────────────────┐  ─ 103
│ The heating furnace is heated to a temperature in a      │
│ range from about 800 °C to about 950 °C, and the carbon  │
│ nanotube material is oxidized in the carbon dioxide.     │
└─────────────────────────────────────────────────────────┘

┌─────────────────────────────────────────────────────────┐  ─ 104
│ The carbon nanotube material oxidized in the carbon      │
│ dioxide is placed and dispersed in a first mixed         │
│ solution to form a carbon nanotube suspension. The first │
│ mixed solution comprises a first organic solvent and a   │
│ water.                                                   │
└─────────────────────────────────────────────────────────┘

┌─────────────────────────────────────────────────────────┐  ─ 105
│ An active material is provided and ultrasonically        │
│ dispersed in a second organic solvent to form an active  │
│ material dispersion. The carbon nanotube suspension is   │
│ mixed with the active material dispersion to form a      │
│ second mixed solution.                                   │
└─────────────────────────────────────────────────────────┘

┌─────────────────────────────────────────────────────────┐  ─ 106
│ The second mixed solution is stirred by ultrasonic, the  │
│ second mixed solution is dried after filtering the       │
│ second mixed solution.                                   │
└─────────────────────────────────────────────────────────┘
```

FIG.1

METHOD FOR MAKING BATTERY ELECTRODES

This application claims all benefits accruing under 35 U.S.C. § 119 from China Patent Application No. 201810064090.9, filed on Jan. 23, 2018, in the China National Intellectual Property Administration, the contents of which are hereby incorporated by reference. The application is also related to copending applications entitled, "METHOD FOR OXIDIZING MULTI-WALLED CARBON NANOTUBESES", filed ****.

FIELD

The present disclosure relates to a method for making a battery electrode.

BACKGROUND

With the consumption of fossil fuels and environmental problems, it is necessary to find a sustainable clean energy. Lithium-sulfur batteries have attracted much attention due to their high theoretical specific capacity (1672 mAhg$^{-1}$) and high energy density (2570 Wh kg$^{-1}$). Moreover, a sulfur is naturally rich, non-toxic and safe, so Li—S batteries are considered to be the best candidates for high capacity and low cost systems. However, the practical application of the lithium-sulfur batteries has problems such as low utilization of sulfur, low coulombic efficiency, and rapid capacity decay. These problems are caused by a poor conductivity of sulfur and discharge products $Li_2S$ and a dissolution of an intermediate product lithium polysulfide ($Li_2S_x$, $4 \leq x \leq 8$).

In order to solve the above problems, carbon materials are generally used to improve the utilization of sulfur, such as mesoporous carbon, graphene, carbon nanotubes (CNTs) and carbon spheres. The carbon nanotubes are considered the most promising carbon materials due to their open pore structure, high conductivity and one-dimensional flexible nanostructure. However, due to the van der Waals force between the carbon nanotubes, a plurality of carbon nanotubes may aggregate. A number of sulfur-bearing sites on a surface of the carbon nanotubes is reduced. A sulfur content in the lithium-sulfur battery is limited.

BRIEF DESCRIPTION OF THE DRAWINGS

Implementations of the present technology will now be described, by way of example only, with reference to the attached figures.

FIG. 1 is a flowchart of one embodiment of a method for making a battery electrode.

DETAILED DESCRIPTION

Figure 2:
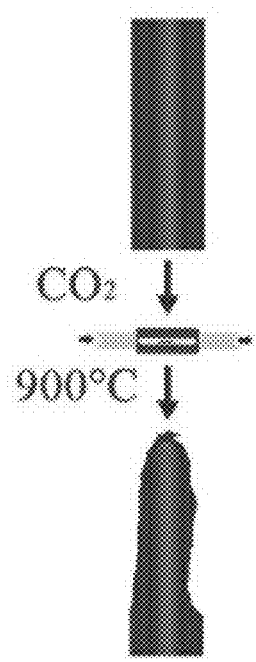
FIG. 2 is a schematic view of one embodiment of a multi-walled carbon nanotube oxidized in a carbon dioxide at a temperature 900° C.

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean "at least one".

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale, and the proportions of certain parts may be exaggerated to illustrate details and features of the present disclosure better.

Several definitions that apply throughout this disclosure will now be presented.

The term "comprise" or "comprising" when utilized, means "include or including, but not necessarily limited to"; it specifically indicates open-ended inclusion or membership in the so-described combination, group, series, and the like.

A flowchart is presented in accordance with an example embodiment as illustrated. The embodiment of a method for making a battery electrode 1 is provided by way of example, as there are a variety of ways to carry out the method. The method 1 described below can be carried out using the configurations illustrated in FIGS. 1 to 2. Each block represents one or more processes, methods, or subroutines carried out in the exemplary method 1. Additionally, the illustrated order of blocks is by example only, and the order of the blocks can be changed. The exemplary method 1 can begin at block 101. Depending on the embodiment, additional steps can be added, others removed, and the ordering of the steps can be changed.

At block 101, a carbon nanotube material is provided, and the carbon nanotube material comprises a plurality of carbon nanotubes.

At block 102, the carbon nanotube material is placed into a heating furnace, and the heating furnace comprises a carbon dioxide gas.

At block 103, the heating furnace is heated to a temperature in a range from about 800° C. to about 950° C., and the carbon nanotube material is oxidized in the carbon dioxide.

At block 104, the carbon nanotube material oxidized in the carbon dioxide is placed and dispersed in a first mixed solution to form a carbon nanotube suspension. The first mixed solution comprises a first organic solvent and a water.

At block 105, an active material is provided and ultrasonically dispersed in a second organic solvent to form an active material dispersion. The carbon nanotube suspension is mixed with the active material dispersion to form a second mixed solution.

At block 106, the second mixed solution is stirred by ultrasonic, the second mixed solution is dried after filtering the second mixed solution.

At block 101, the plurality of carbon nanotubes are a plurality of multi-walled carbon nanotubes. In one embodiment, the carbon nanotube material consists of the plurality of multi-walled carbon nanotube. A diameter and a length of the plurality of multi-walled carbon nanotubes is not limited. The diameter of each of the multi-walled carbon nanotube is ranged from 20 nm-30 nm. The length of each of the multi-walled carbon nanotube is about 50 µm or more. In one embodiment, the length of each of the multi-walled carbon nanotube is about 300 µm.

The plurality of multi-walled carbon nanotubes are parallel to each other and in close contact with each other by van der Waals forces. The carbon nanotube material can be a super-aligned carbon nanotube array. The super-aligned carbon nanotube array is prepared by a chemical vapor deposition method.

The super-aligned carbon nanotube array can be formed by the following substeps: (S1011) providing a substantially flat and smooth substrate; (S1012) forming a catalyst layer on the substrate; (S1013) annealing the substrate with the catalyst layer in air at a temperature ranging from about 700° C. to about 900° C. for about 30 to 90 minutes; (S1014) heating the substrate with the catalyst layer to a temperature ranging from about 500° C. to about 740° C. in a furnace with a protective gas therein; (S1015) supplying a carbon source gas to the furnace for about 5 to 30 minutes and growing the super-aligned carbon nanotube array on the substrate; and (S1016) removing the substrate to just obtain the plurality of multi-walled carbon nanotubes. grown on the substrate that are parallel to each other and in close contact with each other by van der Waals force.

In step (S1011), the substrate can be a P-type silicon wafer, an N-type silicon wafer, or a silicon wafer with a film of silicon dioxide thereon. In one embodiment, a 4-inch P-type silicon wafer is used as the substrate.

In step (S1012), the catalyst can be made of iron (Fe), cobalt (Co), nickel (Ni), or any alloy thereof.

In step (S1015), the super-aligned carbon nanotube array consists of the plurality of multi-walled carbon nanotubes, and the plurality of multi-walled carbon nanotubes are parallel to each other and perpendicular to the substrate. The length of the super-aligned carbon nanotube array is about 200 µm to about 400 µm.

In step (S1016), the plurality of multi-walled carbon nanotubes are parallel to each other and in close contact with each other by van der Waals forces.

The super-aligned carbon nanotube array formed under the above conditions is essentially free of impurities such as carbonaceous or residual catalyst particles.

The active material can be an active material in any energy storage system, such as sulfur particles, manganese dioxide particles. In this embodiment, the active material is a sulfur.

At block 102, the heating furnace is a closed vessel, such as a tube furnace or a muffle furnace. The heating furnace comprises the carbon dioxide gas. In one embodiment, the heating furnace just filled with the carbon dioxide gas. In one embodiment, the at least one multi-walled carbon nanotube is placed in the tube furnace just filled with pure carbon dioxide gas.

At block 103, a heating time of the heating furnace is not limited. A heating process of the plurality of multi-walled carbon nanotubes in the heating furnace comprises the following steps: (S1031) heating the heating furnace at a constant rate until reaching a temperature ranged from about 800° C. to about 950° C.; (S1032) keeping heat the plurality of multi-walled carbon nanotubes at the temperature ranged from about 800° C. to about 950° C. for about 10 minutes to about 90 minutes. When the heating furnace is heated at the temperature ranged from about 800° C. to about 950° C., a mass loss of the plurality of multi-walled carbon nanotubes in the heating furnace is less than 20%. That is to say, the plurality of multi-walled carbon nanotubes are oxidized in the carbon dioxide at the temperature ranged from about 800° C. to about 950° C. In one embodiment, the heating furnace is heated at a rate of 30° C. per minute filled with the carbon dioxide gas until the temperature reaches 900° C., and the plurality of multi-walled carbon nanotubes are heated at the temperature 900° C. for 60 minutes.

Figure 3:
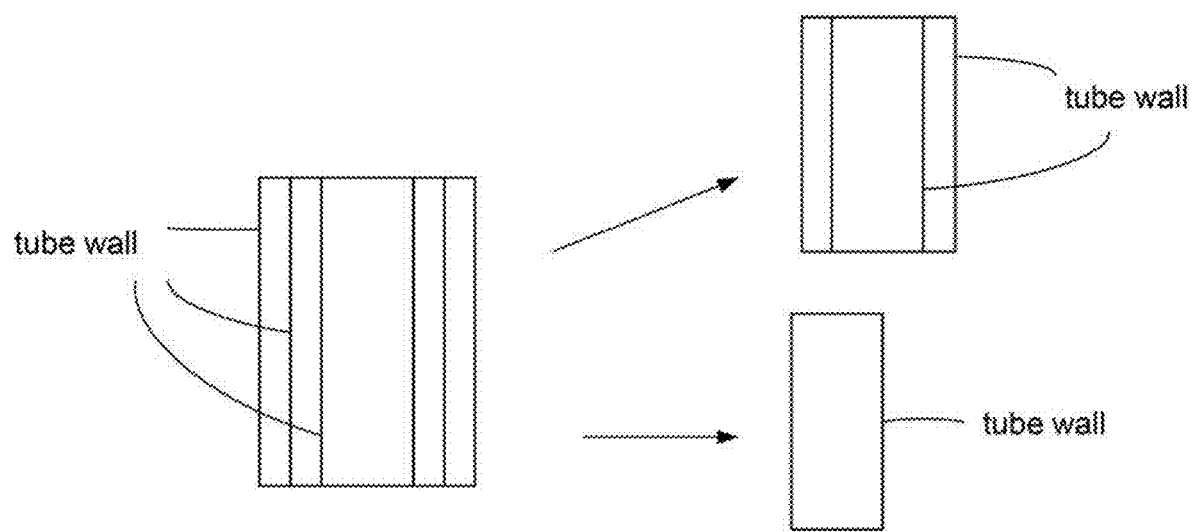
FIG. 3 is a schematic view of one embodiment of a multi-walled carbon nanotube tube wall completely is peeled off after an oxidation reaction in the carbon dioxide.
Figure 4:
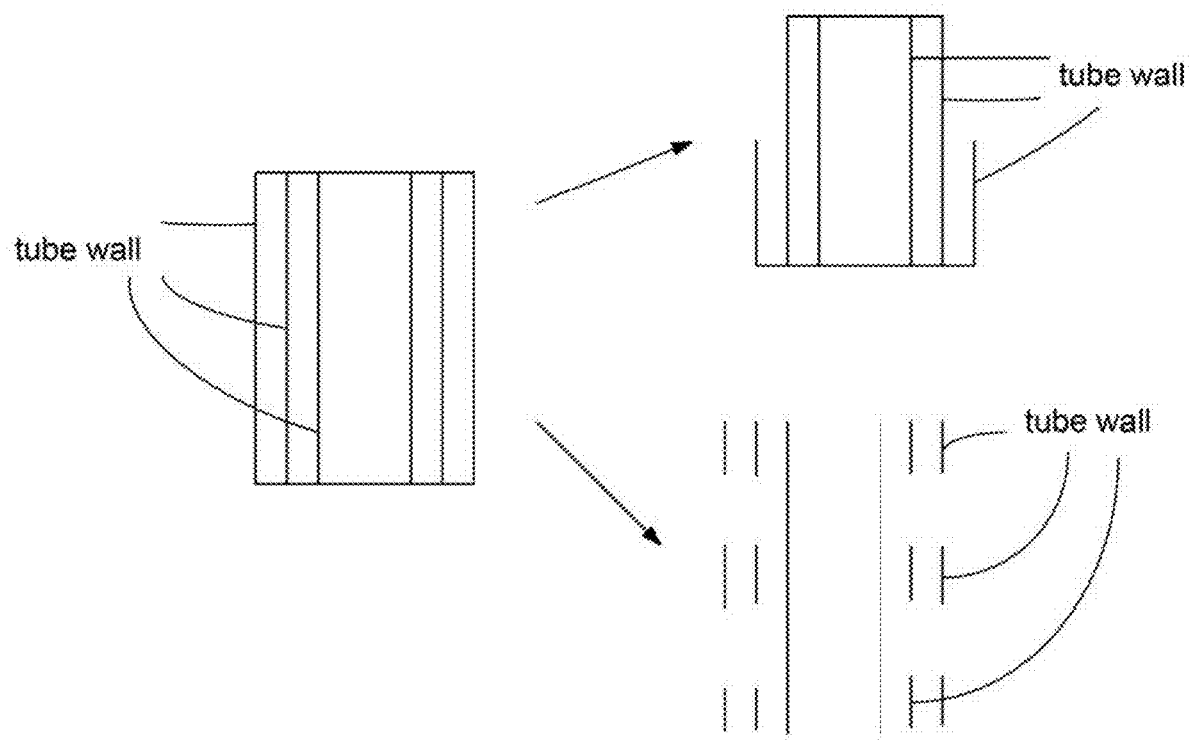
FIG. 4 is a schematic view of one embodiment of the multi-walled carbon nanotube tube wall partly peeled off after the oxidation reaction in the carbon dioxide.

During the heating process, the carbon dioxide gas undergoes a redox reaction with carbon atoms on the surface of a multi-walled carbon nanotube to form a carbon monoxide. A multi-walled carbon nanotube tube wall is continuously peeled off, and the diameter of the multi-walled carbon nanotube is reduced. A peeling of the multi-walled carbon nanotube tube wall causes the mass loss of the multi-walled carbon nanotube. In one embodiments, the multi-walled carbon nanotube tube wall comprises three layers. As shown in FIG. 3, the multi-walled carbon nanotube tube wall can be completely peeled off; or as shown in FIG. 4, the multi-walled carbon nanotube tube wall can be partially peeled off to form a patterned multi-walled carbon nanotube. In one embodiment, one layer or two layers of the multi-walled carbon nanotube tube wall can be completely peeled off. In another embodiment, one layer or two layers of the multi-walled carbon nanotube tube wall can be partially peeled off. The multi-walled carbon nanotube tube wall continuously peeled off is a sheet structure. A shape of the sheet structure is determined by an oxidation reaction time of the multi-walled carbon nanotube in the carbon dioxide and the heating temperature. In one embodiment, a thickness of the sheet structure is ranged from about 1 nm to about 3 nm, and a length of the sheet structure is 50 nm or more.

When the length of the multi-walled carbon nanotube is 300 micrometers or more, a plurality of different locations of the multi-walled carbon nanotube tube wall can be continuously peeled off during the oxidation reaction to form the patterned multi-walled carbon nanotube. In the oxidation process, an complete layer of the multi-walled carbon nanotube tube wall may not be peeled off easily. Therefore, in order to peel off the layer of the multi-walled carbon nanotube tube wall completely, the length of the multi-walled carbon nanotube can be less than or equal to 100 μm. In one embodiment, the length of the multi-walled carbon nanotube can be less than or equal to 50 μm.

Since the carbon dioxide is a weak oxidant, in the oxidation process of the multi-walled carbon nanotube, the oxidization and peeling off processes will proceed preferentially along the length direction of the multi-walled carbon nanotube. Therefore, the structure of the multi-walled carbon nanotube is not be severely damaged, and the multi-walled carbon nanotube tube wall peeled off is the sheet structure. From a viewpoint of a functional group, a plurality of carbon-oxygen single bond functional groups appear at locations where the multi-walled carbon nanotube tube wall are peeled off. After the multi-walled carbon nanotube tube wall are continuously peeled off, the surface of the multi-walled carbon nanotube comprises a plurality of carbon-oxygen single bonds. In one embodiment, after the multi-walled carbon nanotube tube wall are continuously peeled off, the surface of the multi-walled carbon nanotube just has a plurality of carbon-oxygen single bonds.

After the multi-walled carbon nanotubes tube walls is continuously peeled off, the surface of the multi-walled carbon nanotube just has a carbon-oxygen single bond functional group and has a negative charge. The carbon-oxygen single bond functional group can be a hydroxyl group or a phenol group. Since an oxidative defect on the multi-walled carbon nanotube tube wall is uniform, the carbon-oxygen single bond functional group and the negative charge carried on the surface of the multi-walled carbon nanotubes are also uniform.

The present invention further compares two different oxidation methods: a method for oxidizing the multi-walled carbon nanotubes in carbon dioxide and a method for oxidizing the multi-walled carbon nanotubes in air. The term "carbon dioxide-oxidized multi-walled carbon nanotube" when utilized, means "the multi-walled carbon nanotube has been oxidized in the carbon dioxide". The term "air-oxidized multi-walled carbon nanotube" when utilized, means "the multi-walled carbon nanotube has been oxidized in the air".

Example 1

In Example 1, the multi-walled carbon nanotube is placed in the heating furnace filled with a pure carbon dioxide gas. The heating furnace is heated at a rate of 30° C. per minute until the temperature reaches 900° C., and continue heating the multi-walled carbon nanotube at the temperature 900° C. for 60 minutes.

Comparative Example 1

In Comparative Example 1, the multi-walled carbon nanotube is placed in the heating furnace filled with air. The heating furnace is heated at a rate of 30° C. per minute until the temperature reaches 550° C., and continue heating the multi-walled carbon nanotube at the temperature 550° C. for 30 minutes.

The difference between the Example 1 and the Comparative Example 1 is that oxidation gases, oxidation temperature and oxidation time are different.

Figure 5:
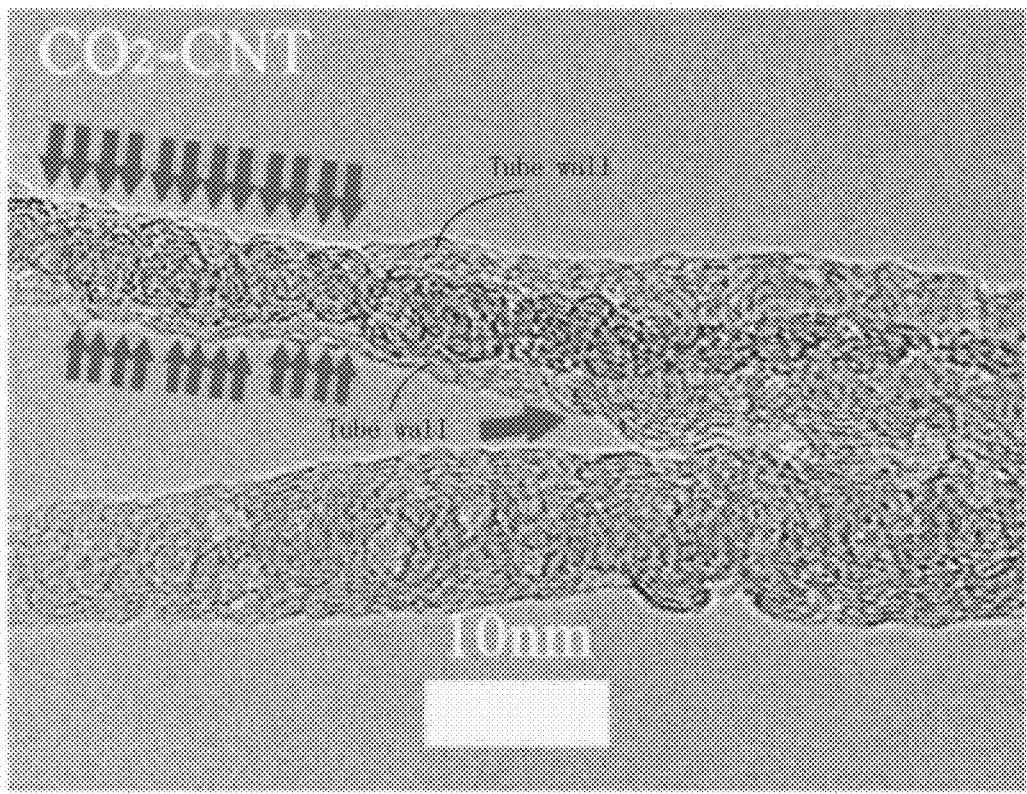
FIG. 5 is a transmission electron micrograph of a carbon dioxide-oxidized multi-walled carbon nanotube.
Figure 6:
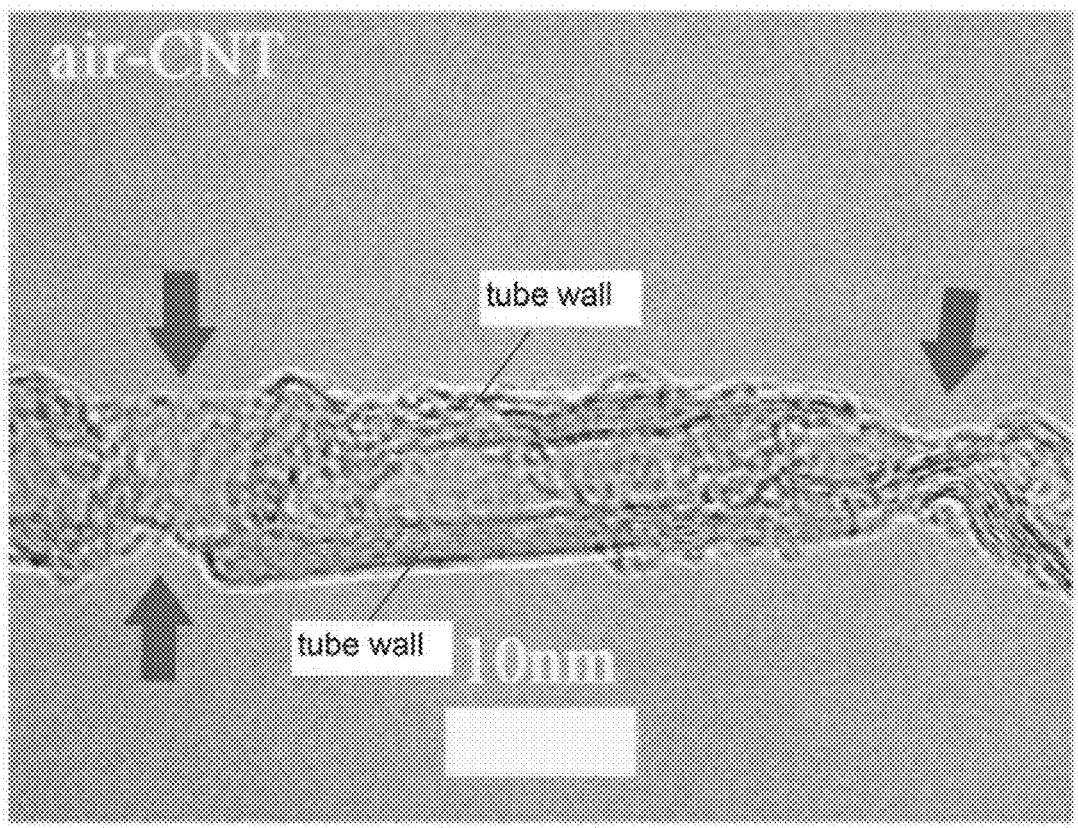
FIG. 6 a transmission electron micrograph of an air-oxidized multi-walled carbon nanotube.

FIG. 5 is a transmission electron micrograph of the carbon dioxide-oxidized multi-walled carbon nanotube. FIG. 6 is a transmission electron micrograph of the air-oxidized multi-walled carbon nanotube. As shown in FIG. 5, a structure of the carbon dioxide-oxidized multi-walled carbon nanotube is not seriously damaged. Comparing FIG. 5 to FIG. 6, the multi-walled carbon nanotube tube walls oxidized by the carbon dioxide is continuously peeled off, and no pores are formed on the surface of the multi-walled carbon nanotube. Since the multi-walled carbon nanotube is oxidized in oxygen, a part of the surface of the multi-walled carbon nanotube is severely deformed and a plurality of pores are formed.

Figure 7:
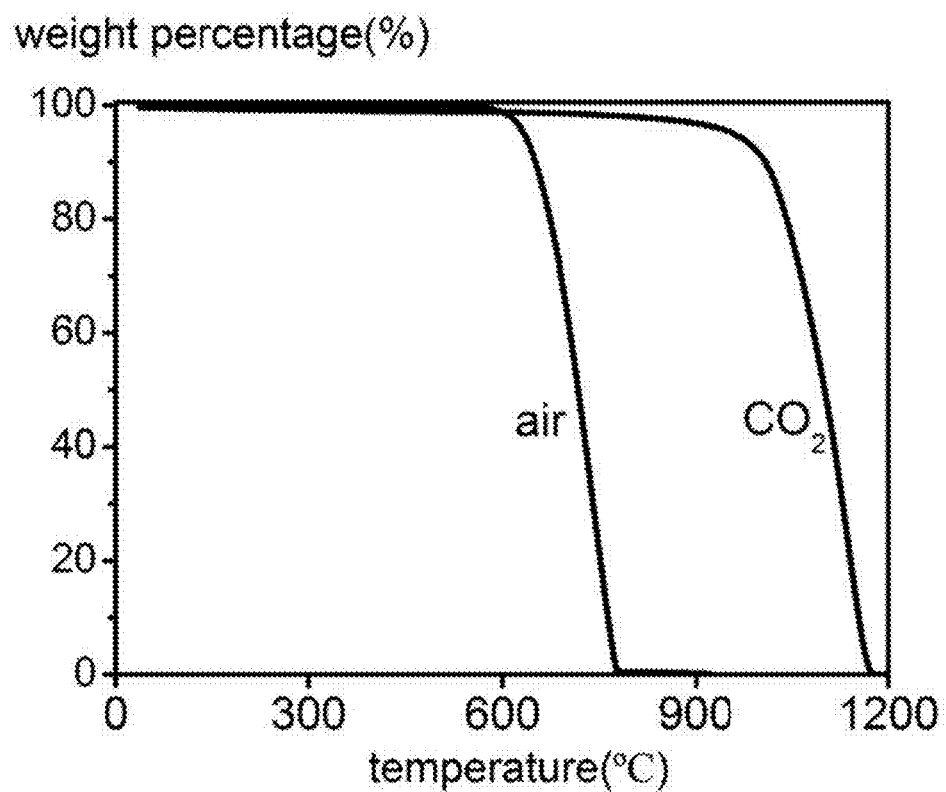
FIG. 7 is a thermogravimetric analysis curves comparison diagram of the carbon dioxide-oxidized multi-walled carbon nanotube and the air-oxidized multi-walled carbon nanotube.

FIG. 7 is a thermogravimetric analysis curves comparison diagram of the carbon dioxide-oxidized multi-walled carbon nanotube and the air-oxidized multi-walled carbon nanotube (the mass fraction of the multi-walled carbon nanotubes at room temperature is 100 wt %). As shown in FIG. 7, the air-oxidized multi-walled carbon nanotube has a serious mass loss at the temperature in a range from about 651° C. to about 763° C., and a mass of multi-walled carbon nanotube is reduced from 90 wt % to 10 wt %. However, the carbon dioxide-oxidized multi-walled carbon nanotube has a severe mass loss at the temperature in a range from about 1009° C. to about 1154° C., and the mass of multi-walled carbon nanotube is reduced from 90 wt % to 10 wt %. In one embodiment, in order to obtain an oxidative modification of the multi-walled carbon nanotube without losing too much mass, the oxidation temperature of the multi-walled carbon nanotube in the carbon dioxide is about 900° C., the oxidation temperature of the multi-walled carbon nanotube in the air is about 550° C.

Figure 8:
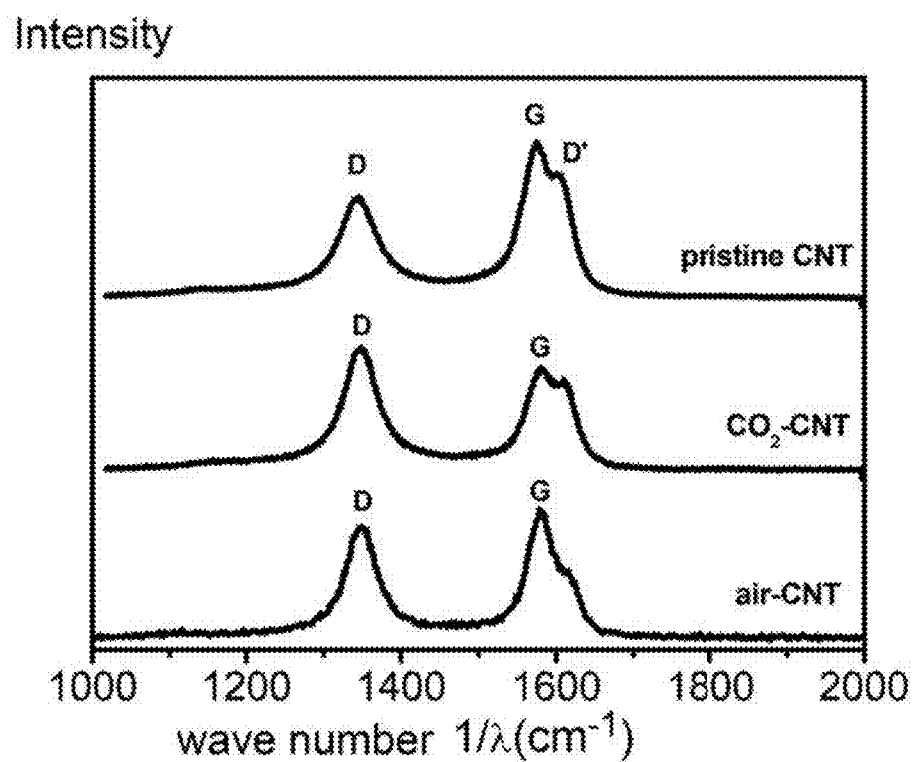
FIG. 8 is a Raman spectra of an untreated multi-walled carbon nanotube, the carbon dioxide-oxidized multi-walled carbon nanotube, and the air-oxidized multi-walled carbon nanotube.

Referring to FIG. 8, the three curves respectively represent the Raman spectra of an untreated multi-walled carbon nanotube, the carbon dioxide-oxidized multi-walled carbon nanotubes, and the air-oxidized multi-walled carbon nanotubes. A relative value of a intensity of a D peak represents a amount of $sp^3$ carbon atoms. That is, a six-membered ring of the multi-walled carbon nanotube is destroyed, and an destroyed location of the six-membered ring can be an oxidation site. The relative value of the intensity of a G peak represents an amount of $sp^2$ carbon atoms. That is, the six-membered ring of the multi-walled carbon nanotube is intact and not destroyed. As shown in FIG. 8, an intensity $I_D/I_G$ ratio of the untreated multi-walled carbon nanotube is 0.636; the intensity $I_D/I_G$ ratio of the carbon dioxide-oxidized multi-walled carbon nanotube is 1.204; and the intensity $I_D/I_G$ ratio of the air-oxidized multi-walled carbon nanotube is 0.853. It is shown that the carbon dioxide-oxidized multi-walled carbon nanotube has more oxidation sites.

Figure 9:
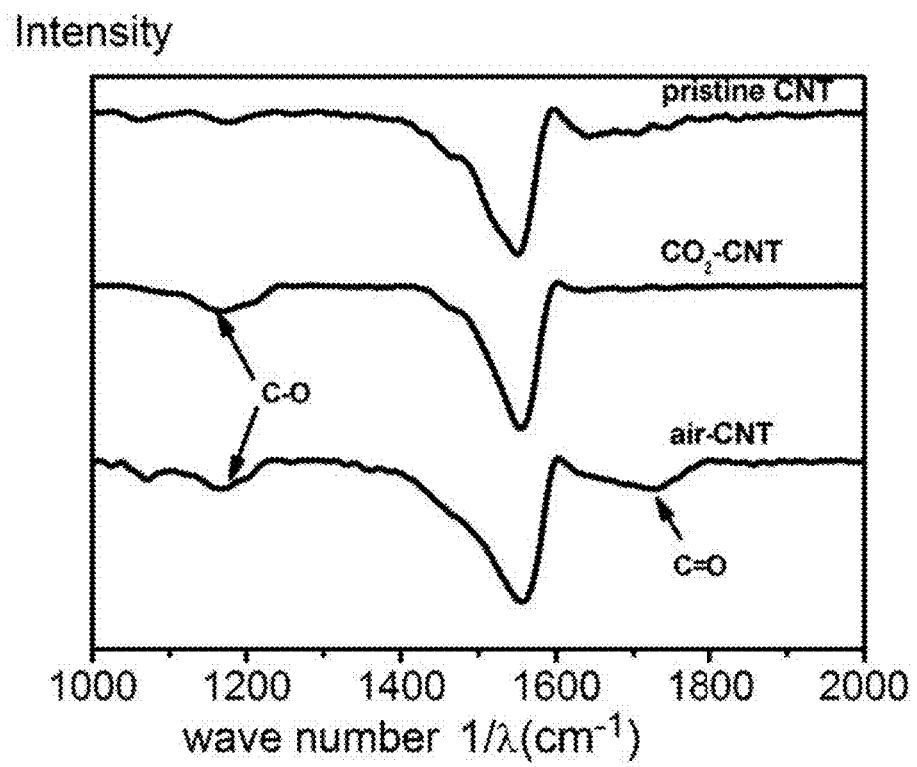
FIG. 9 is an infrared absorption spectra of the untreated multi-walled carbon nanotube, the carbon dioxide-oxidized multi-walled carbon nanotubes and the air-oxidized multi-walled carbon nanotube.

Referring to FIG. 9, the three curves respectively represent an infrared absorption spectra of the untreated multi-walled carbon nanotube, the carbon dioxide-oxidized multi-walled carbon nanotube, and the air-oxidized multi-walled carbon nanotube. As shown in FIG. 9, a number of the carbon-oxygen single bonds functional groups increases in locations of the multi-walled carbon nanotube tube walls peeled off, and a number of the carbon-oxygen double bonds functional groups do not increase, but instead the carbon-oxygen double bonds original existing on the multi-walled carbon nanotube are gone. A plurality of $sp^2$ hybridized carbon atoms on the intact six-membered ring are connected to a plurality of surrounding carbon atoms via three 6 bonds (the π bond and the plurality of surrounding carbon atoms form a conjugation). The carbon atom of the carbon-oxygen single bond can be a $sp^3$ hybridized carbon atom. The $sp^3$ hybridized carbon atom is connected to three adjacent carbon atoms and one oxygen atom. Therefore, the carbon-oxygen single bond may not damage the six-membered ring, and the six-membered ring is not seriously deformed. The carbon atom of the carbon-oxygen double bonds can be the $sp^3$ hybridized carbon atom. The $sp^3$ hybridized carbon atom has four covalent bonds attached to the surrounding atoms, and at least two covalent bonds is connected to oxygen, less than two covalent bonds is connected to the carbon atom. This cannot occur on the intact six-membered ring. Therefore, the carbon-oxygen double bonds appears in the destroyed locations of the six-membered ring. As shown in the infrared spectrum, the carbon dioxide-oxidized multi-walled carbon nanotube has no carbon-oxygen double bonds. Therefore, the six-membered ring is not seriously damaged. Compared with the untreated multi-walled carbon nanotube, the air-oxidized multi-walled carbon nanotube comprise a plurality of C—O single bonds and C=O double bonds; the carbon dioxide-oxidized multi-walled carbon nanotubes just has a plurality of C—O single bonds. The C=O double bonds in the multi-walled carbon nanotube is removed by the carbon dioxide.

Figure 10:
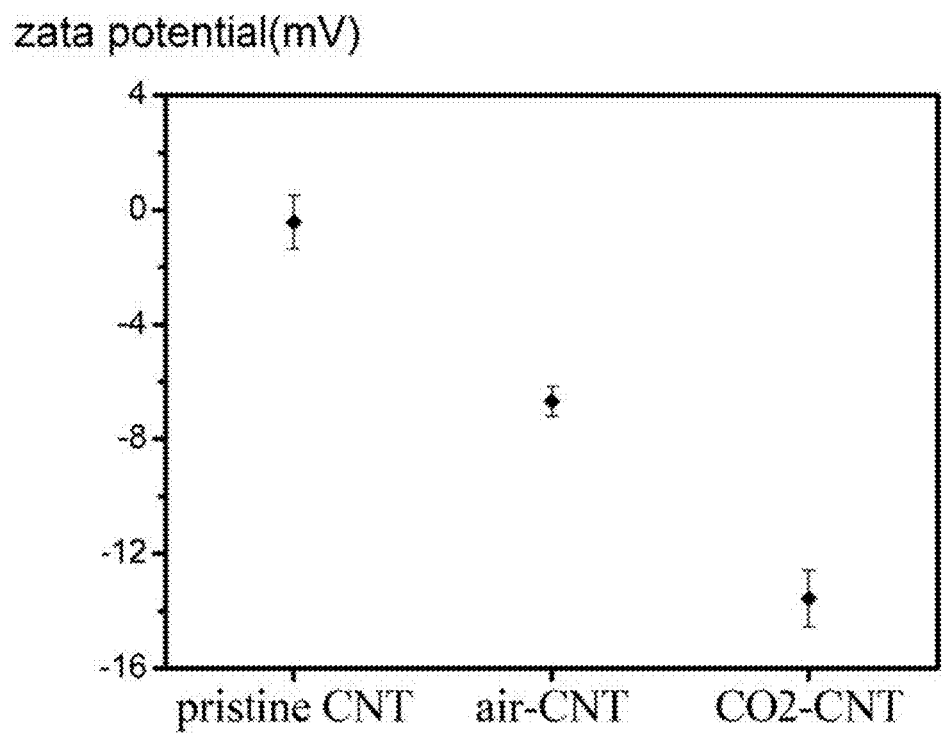
FIG. 10 is zeta potentials comparison diagram of the untreated multi-walled carbon nanotube, the carbon dioxide-oxidized multi-walled carbon nanotube, and the air-oxidized multi-walled carbon nanotube.
Figure 11:
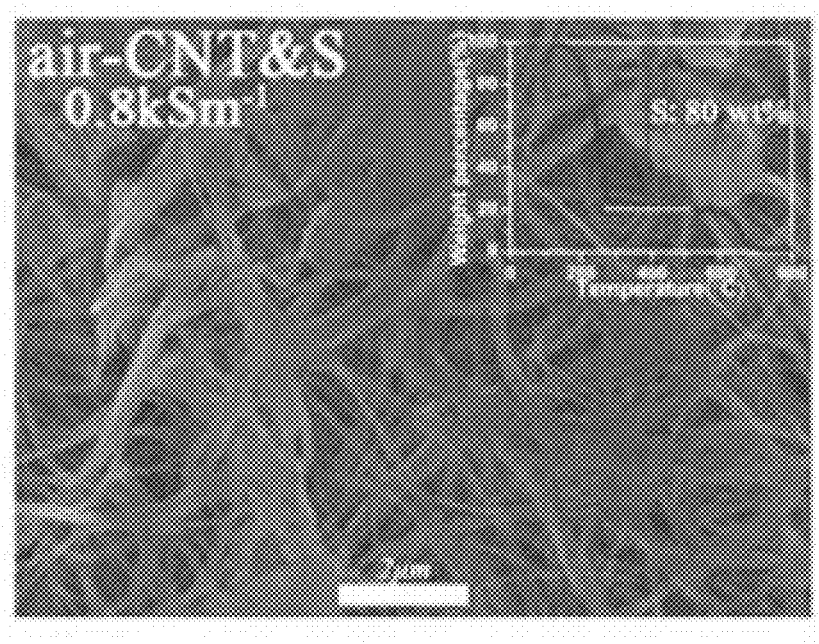
FIG. 11 is a scanning electron microscope of an air-CNT/S composite electrode.
Figure 12:
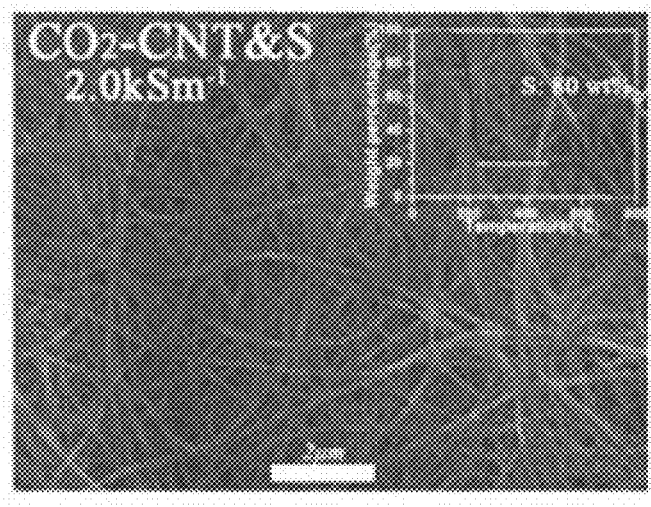
FIG. 12 is a scanning electron microscope of a $CO_2$—CNT/S composite electrode.
Figure 13:
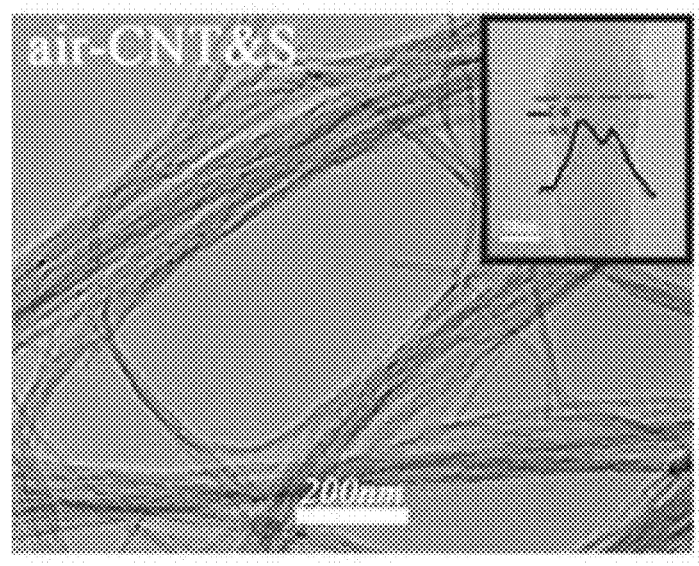
FIG. 13 is a transmission electron micrograph of the air-CNT/S composite electrode.
Figure 14:
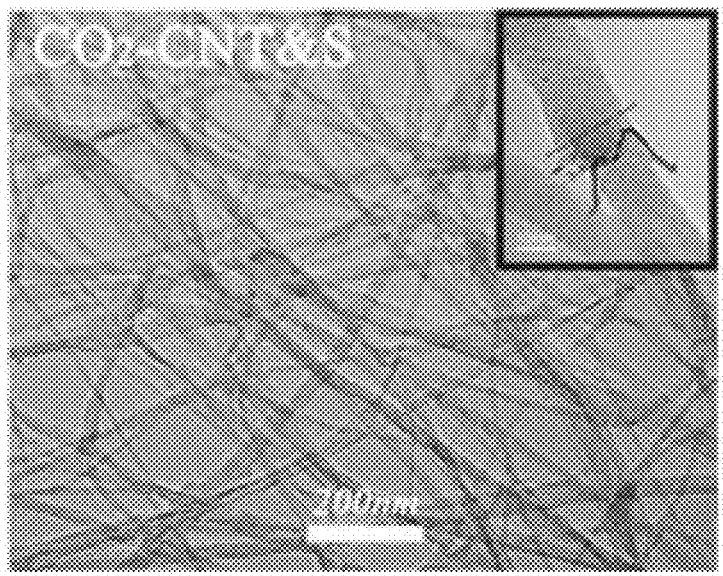
FIG. 14 is a transmission electron micrograph of the $CO_2$—CNT/S composite electrode.

Referring to FIG. 10, three points in the figure respectively are zeta potentials obtained by testing the untreated multi-walled carbon nanotube, the carbon dioxide-oxidized multi-walled carbon nanotube, and the air-oxidized multi-walled carbon nanotube. As shown in FIG. 10, the zeta potential of the untreated multi-walled carbon nanotube is close to zero; the zeta potential of the air-oxidized multi-walled carbon nanotube is −6.6V; the zeta potential of the carbon dioxide-oxidized multi-walled carbon nanotube is −13.6V. Therefore, the surface of the carbon dioxide-oxidized multi-walled carbon nanotube has more negative charges.

The method for oxidizing multi-walled carbon nanotubes can modify the multi-walled carbon nanotube simply and quickly by using pure carbon dioxide gas without adding a solvent. Secondly, the surface of the multi-walled carbon nanotube is continuously peeled off and does not form pores by this method. The surface of the multi-walled carbon nanotubes just has a single C—O bond, and the negative charge is uniformly distributed on the surface of the multi-walled carbon nanotube.

At block 104, the first organic solvent is not limited as long as it is an organic solvent can be miscible with water. The first organic solvent can be ethanol, propanol or methanol. In one embodiment, the first organic solvent is ethanol. The first mixed solution is mixed by the first organic solvent and the water.

Each surface of the multi-walled carbon nanotube after oxidation has the negative charge, and a coulomb repulsion is generated between the adjacent two multi-walled carbon nanotubes. When the plurality of multi-walled carbon nanotubes are dispersed in the first mixed solution, the van der Waals force between two adjacent multi-walled carbon nanotubes is overcame by the coulomb repulsion. After stirring the first mixed solution, since the coulomb repulsion always exists, an agglomeration does not occur between the plurality of carbon nanotubes, and the plurality of multi-walled carbon nanotubes can be uniformly dispersed. Therefore, the plurality of multi-walled carbon nanotubes in the carbon nanotube suspension are uniformly dispersed and do not aggregate into a bundle.

At block 105, the second organic solvent can be the same as the first organic solvent. The second organic solvent is used to disperse the active material. In one embodiment, the second organic solvent is ethanol. The carbon nanotube suspension is dropped into the active material dispersion at a slow rate to uniformly mix the active material with the plurality of multi-walled carbon nanotubes.

At block 106, the second mixed solution comprises the active material and the plurality of multi-walled carbon nanotubes. The second mixed solution is ultrasonically stirred to make the active material uniformly mixed with the plurality of multi-walled carbon nanotubes. The second mixed solution is filtered to form a composite electrode after ultrasonically dispersing the second mixed solution. The composite electrode is a thin film structure. In one embodiment, the composite electrode is a free-standing film structure, and the active material is uniformly coated on the surface of each of the multi-walled carbon nanotube.

When the length of the multi-walled carbon nanotube in the carbon nanotube material is less than 50 micrometers, the composite electrode is not a free-standing structure and can not be directly used as an electrode. The composite electrode need to dispose on a current collector through a binder. When the length of the multi-walled carbon nanotube in the carbon nanotube material is greater than equal to 50 micrometers, the composite electrode is a free-standing thin film structure. Therefore, the composite electrode can be directly used as a battery electrode without the binder and the current collector.

When the active material is the sulfur particles, it is no need to dry the composite electrode at block 106, the method for making a battery electrode 1 can further comprises a block 107. At block 107, the composite electrode obtained at block 106 is heated at a temperature ranged from about 155° C. to about 180° C. At block 107, on the one hand, the composite electrode is dried by heating; on the other hand, the sulfur particles are heated to form a molten sulfur, so that sulfur particles are more uniformly distributed on the surface of each multi-walled carbon nanotube. This is because a diameter of the sulfur particles is larger after an ultrasonic dispersion of the second mixed solution at block 106. The diameter of the sulfur particles is greater than about 50 nm. The sulfur particles are heated to form the molten sulfur at the temperature ranged from about 155° C. to about 180° C., and the sulfur particles have a smaller diameter after cooling the molten sulfur.

A air-CNT/S composite electrode is formed by the air-oxidized multi-walled carbon nanotube and the sulfur particles. A $CO_2$—CNT/S composite electrode is formed by the carbon dioxide-oxidized multi-walled carbon nanotube and the sulfur particles. Referring to FIG. 11 to FIG. 14, the plurality of multi-walled carbon nanotubes and the sulfur particles are aggregated into bundles in the air-CNT/S composite electrode; each of the plurality of multi-walled carbon nanotubes is uniformly dispersed in the $CO_2$—CNT/S composite electrode, and the sulfur particles are uniformly coated on the surface of each of the plurality of multi-walled carbon nanotubes. Therefore, the sulfur particles coated on the multi-walled carbon nanotube are uniformly dispersed, and a sulfur content can reach 80 wt %. Since the sulfur particles are uniformly dispersed in the $CO_2$—CNT/S composite electrode, a lithium ion diffusion distance is shorten in charge and discharge, and an electrolyte has a good penetration. Since the plurality of multi-walled carbon nanotubes are uniformly dispersed, surfaces of plurality of multi-walled carbon nanotubes provides a plurality of sites for a sulfur redox reaction. Therefore, a reaction kinetics of the $CO_2$—CNT/S composite electrode is enhanced. In one embodiment, a sulfur loading of the $CO_2$—CNT/S composite electrode is 1.4 mg/cm$^2$, and a conductivity of the $CO_2$—CNT/S composite electrode is 2.0 kS m$^{-1}$.

In one embodiment, the $CO_2$—CNT/S composite electrode and the air-CNT/S composite electrode are respectively assembled into two batteries. A series of tests were performed on the two batteries, as shown in FIG. 15 to FIG. 18.

Figure 15:
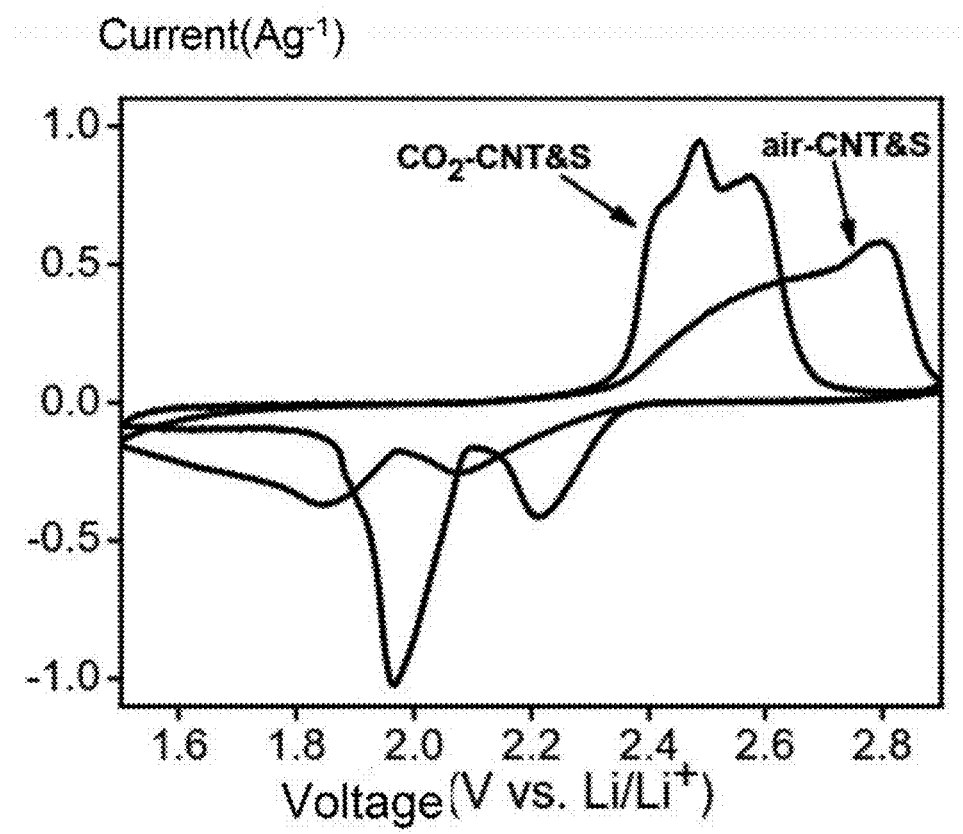
FIG. 15 is a cyclic voltammetry (CV) curves of the air-CNT/S composite electrode and the $CO_2$—CNT/S composite electrode.

FIG. 15 shows a cyclic voltammetry (CV) curves of the air-CNT/S composite electrode and the $CO_2$—CNT/S composite electrode, and a voltage sweep rate is 0.1 mV/s. For the $CO_2$—CNT/S composite electrode, two distinct reduction peaks were observed at 2.21V and 1.97V, respectively corresponding to a reaction from $S_8$ ring to $Li_2S_x$ (4<x<8) and a reaction from $Li_2S_x$ (4<x<8) to $Li_2S_x$ (1<x<4). In the subsequent charging process, two oxidation peaks appear at 2.48 V and 2.57 V, and respectively reflect a formation of $Li_2S_x$ (1<x<4) and $S_8$ ring. Compared with the $CO_2$—CNT/S composite electrode, a CV peak of the air-CNT/S composite electrode is winder. Therefore, the reaction kinetics of the air-CNT/S composite electrode is hindered, the polarization of the air-CNT/S composite electrode is stronger, and a performance of the air-CNT/S composite electrode is worse than that of the $CO_2$—CNT/S composite electrode. A sharper redox peak of the $CO_2$—CNT/S composite electrode indicates a good reaction kinetics process due to a shorter lithium ion diffusion distance. A small voltage difference in charge voltage and discharge voltage indicates a slight polarization, leading to a robust electrochemical reversibility. These results indicates that an uniform deposition of sulfur/$Li_2S$ on surfaces of the plurality of multi-walled carbon nanotubes prevents local charge accumulation, leading to alleviation of polarization.

Figure 16:
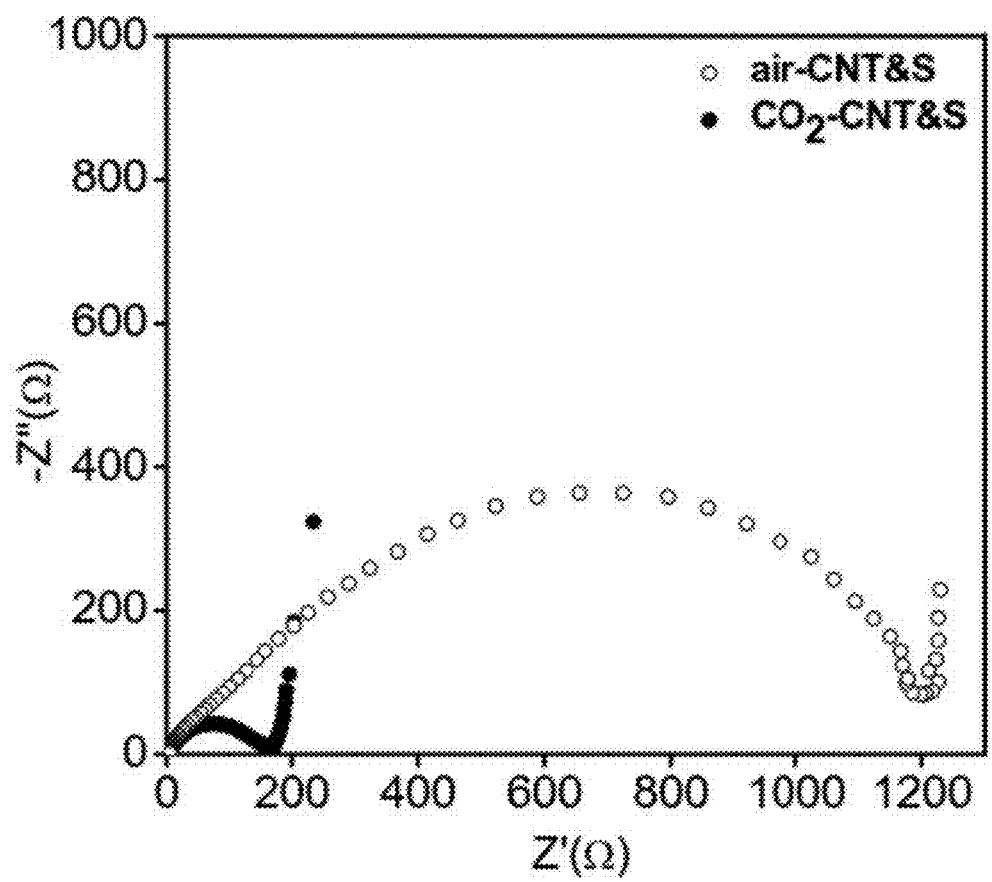
FIG. 16 is an electrochemical properties of the air-CNT/S composite electrode and the $CO_2$—CNT/S composite electrode characterized by electrochemical impedance spectroscopy (EIS).

Electrochemical properties of the air-CNT/S composite electrode and the $CO_2$—CNT/S composite electrode are characterized by electrochemical impedance spectroscopy (EIS) in FIG. 16. As shown in FIG. 16, a smaller ohmic resistance of the CO2-CNT/S composite electrode (4.7Ω) compared to the air-CNT/S composite electrode (5.5Ω) is in good accordance with an electrical conductivity measurements, and would be beneficial for a sulfur utilization and cycling performance. A diameter of a semicircle in the high-frequency regions corresponds to a charge transfer resistance (Rct) in the Faraday process. A Rct of the $CO_2$—CNT/S composite electrode is 164Ω, and a Rct of the air-CNT/S composite electrode is 1200Ω. The smaller Rct of the $CO_2$—CNT/S composite electrode is attributed to a more uniform structure and a higher conductivity of the $CO_2$—CNT/S composite electrode. Sufficient active sites ensures a rapid charge transport and a faster reaction kinetics. Therefore, the $CO_2$—CNT/S composite electrode has a good rate performance.

Figure 17:
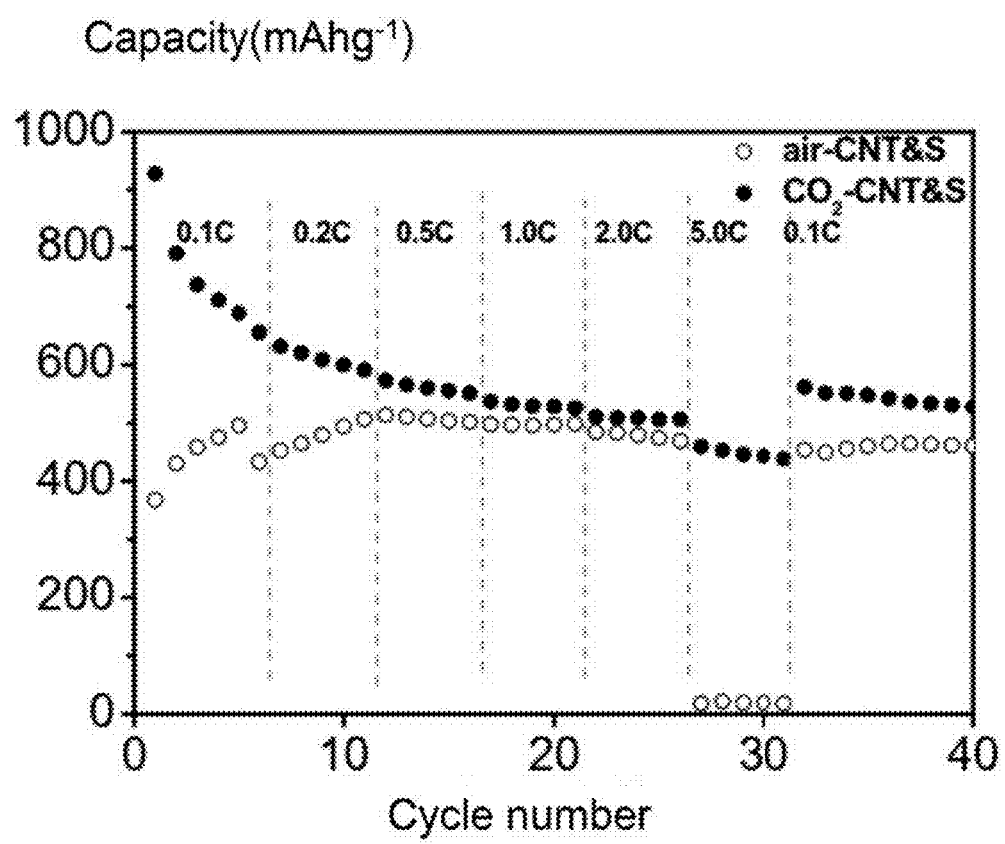
FIG. 17 is a rate tests of the $CO_2$—CNT/S composite electrode and the air-CNT/S composite electrode at a constant discharge rate of 0.2 C.

FIG. 17 is rate tests of the $CO_2$—CNT/S composite electrode and the air-CNT/S composite electrode with varied charge rates at a constant discharge rate of 0.2 C. A discharge capacity of the $CO_2$—CNT/S is 560.2 mAhg$^{-1}$ at a charge rate of 0.5 C. The discharge capacity of the $CO_2$—CNT/S is 529.1 mAhg$^{-1}$ at a charge rate of 1 C. The discharge capacity of the $CO_2$—CNT/S is 508.3 mAhg$^{-1}$ at a charge rate of 2 C. The discharge capacity of the $CO_2$—CNT/S is 459.6 mAhg$^{-1}$ at a charge rate of 5 C. Due to a large Rct and a slow reaction kinetics, the air-CNT/S composite electrode exhibits an inferior rate performance. Especially at the charge rate of 5 C, a specific capacity rapidly decays to zero because a charge transportation is affected by an inhomogeneous distribution of the air-oxidized multi-walled carbon nanotubes and the sulfur particles.

Figure 18:
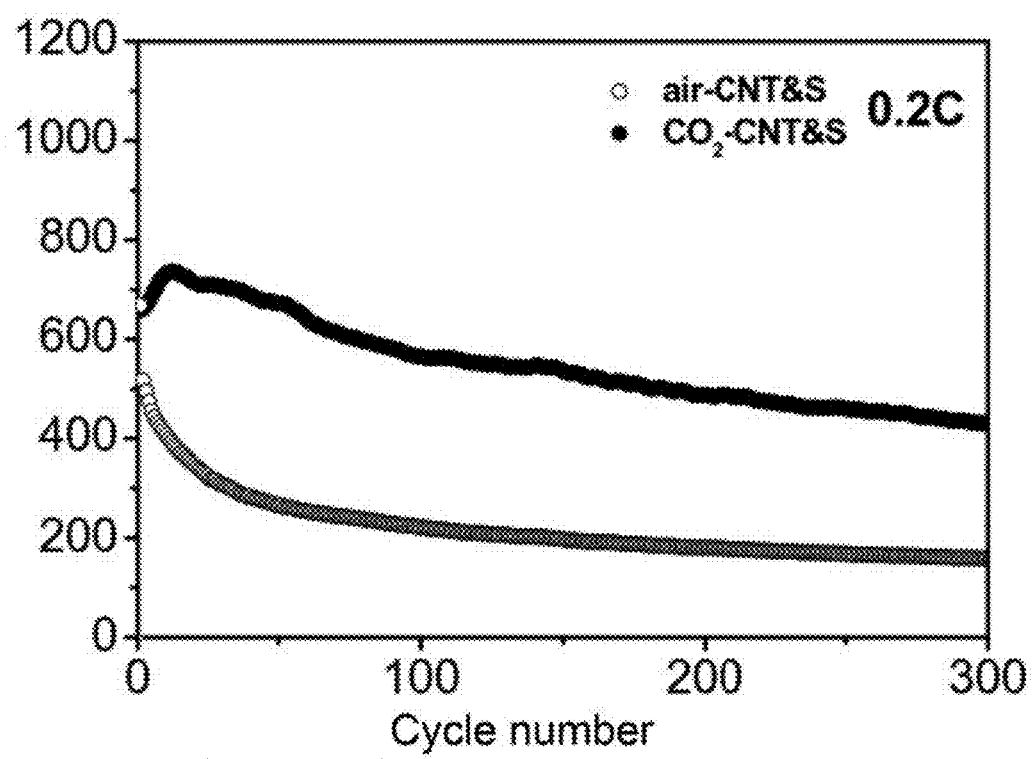
FIG. 18 is a cycle stability of the air-CNT/S composite electrode and $CO_2$—CNT/S composite electrode is tested at the cycle rate of 0.2 C under 300 cycles.

As shown in FIG. 18, 300 cycles are performed at the cycle rate of 0.2 C, and a cycle stability of the air-CNT/S composite electrode and $CO_2$—CNT/S composite electrode is tested. The specific capacity of the $CO_2$—CNT/S composite electrode increases gradually to 736.2 mAhg$^{-1}$ after 12 cycles. The specific capacity of the $CO_2$—CNT/S composite electrode maintains 430.5 mAhg$^{-1}$ after 300 cycles, corresponding to a small fade rate of 0.172% per cycle. In contrast, a initial specific capacity of the air-CNT/S composite electrode is 660.8 mAhg$^{-1}_{sulfur}$, and a specific capacity of the air-CNT/S composite electrode fades to 265.1 mAhg$^{-1}_{sulfur}$ over 50 cycles, indicating a fast specific capacity degradation of the air-CNT/S composite electrode. After 300 cycles, the specific capacity of the air-CNT/S composite electrode is only 159.4 mAhg$^{-1}_{sulfur}$. The $CO_2$—CNT/S composite electrode has a superior cycling stability compared to the air-CNT/S composite electrode.

The method for preparing a battery electrode provided adopts an ultrasonic-assisted method and vacuum filtration to form a composite electrode. In this method, the plurality of multi-walled carbon nanotubes are previously oxidized by carbon dioxide, a plurality of carbon-oxygen single bonds are formed on the surface of each multi-walled carbon nanotube, and the surface of each multi-walled carbon nanotube has a negative charge. A coulomb repulsion is formed between adjacent multi-walled carbon nanotubes. Therefore, the van der Waals force between the adjacent multi-walled carbon nanotubes is overcame, and the plurality of multi-walled carbon nanotubes are uniformly dispersed. The surface of each multi-walled carbon nanotube can carry the active material, and a content of the active material in the composite electrode is increased. The content of the active material is up to about 80 wt %. The composite electrode comprises the plurality of multi-walled carbon nanotubes, so that the composite electrode has better conductivity. The composite electrode has a three-dimensional continuous electron channel, and the plurality of multi-walled carbon nanotubes with good dispersion can shorten a diffusion length of lithium ions. Therefore, the electrolyte has a good permeability, and sufficient active sites is provided to promote a transmission of electrons and ions. The battery assembled by the composite electrode has a good cycle stability and a good rate performance.

Even though numerous characteristics and advantages of certain inventive embodiments have been set out in the foregoing description, together with details of the structures and functions of the embodiments, the disclosure is illustrative only. Changes may be made in detail, especially in matters of arrangement of parts, within the principles of the present disclosure to the full extent indicated by the broad general meaning of the terms in which the appended claims are expressed.

Depending on the embodiment, certain of the steps of methods described may be removed, others may be added, and the sequence of steps may be altered. It is also to be understood that the description and the claims drawn to a method may comprise some indication in reference to certain steps. However, the indication used is only to be viewed for identification purposes and not as a suggestion as to an order for the steps.

The embodiments shown and described above are only examples. Even though numerous characteristics and advantages of the present technology have been set forth in the foregoing description, together with details of the structure and function of the present disclosure, the disclosure is illustrative only, and changes may be made in the detail, especially in matters of shape, size and arrangement of the parts within the principles of the present disclosure up to, and including the full extent established by the broad general meaning of the terms used in the claims. It will therefore be appreciated that the embodiments described above may be modified within the scope of the claims.

What is claimed is:

1. A method for making a battery electrode, comprising:
providing a carbon nanotube material comprised of a plurality of carbon nanotubes;
placing the carbon nanotube material into a furnace containing carbon dioxide;
heating the furnace to a temperature about 800° C. to about 950° C. and oxidizing the carbon nanotube material in the carbon dioxide, wherein the carbon nanotube material comprises a plurality of multi-walled carbon nanotubes, at least one multi-walled carbon nanotube tube wall is continuously peeled off, and a diameter of the multi-walled carbon nanotube is reduced;
dispersing the carbon nanotube material in a first solution to form a carbon nanotube suspension, wherein the first solution comprises a first organic solvent and a water;
dispersing an active material in a second organic solvent to form an active material dispersion,
mixing the carbon nanotube suspension with the active material dispersion to form a second solution; and
drying the second solution after filtering.

2. The method as claimed in claim 1, wherein a method for making the carbon nanotube material, comprising:
providing a substrate;
forming a catalyst layer on the substrate;
annealing the substrate with the catalyst layer in air at a temperature ranging from about 700° C. to about 900° C. for about 30 to 90 minutes;
heating the substrate with the catalyst layer to a temperature ranging from about 500° C. to about 740° C. in a furnace with a protective gas therein;
supplying a carbon source gas to the furnace for about 5 to 30 minutes and growing a super-aligned carbon nanotube array on the substrate; and
removing the substrate.

3. The method as claimed in claim 1, wherein the furnace is heated to the temperature about 900° C.

4. The method of claim 1, wherein the furnace is a tube furnace or a muffle furnace.

5. The method of claim 1, wherein the furnace contains no other gas.

6. The method of claim 1, wherein the at least one multi-walled carbon nanotube tube wall peeled off is a sheet structure.

7. The method of claim 6, wherein a thickness of the sheet structure ranges from about 1 nm to about 3 nm.

8. The method of claim 6, wherein a length of the sheet structure is greater than or equal to about 50 nm.

9. The method of claim 1, wherein a plurality of C—O single bonds is formed on surfaces of the plurality of multi-walled carbon nanotubes after the at least one multi-walled carbon nanotube tube wall is peeled off.

10. The method of claim 1 wherein the active material is sulfur particles.

11. The method of claim 10, wherein a content of the sulfur particles is about 80 wt %.

12. The method of claim 1, wherein the plurality of carbon nanotubes are uniformly dispersed in the carbon nanotube suspension.

13. The method of claim 1 wherein the second solution is stirred through ultrasonic means.

14. The method of claim 1 wherein the second solution is heat dried at a temperature ranging from about 155° C. to about 180° C.

* * * * *